United States Patent Office 3,099,645
Patented July 30, 1963

3,099,645
POLYMER PROCESS FOR POLYVINYLACETATE WITH ALUMINUM TRIALKYLS AS THE SOLE CATALYST
Herman Wexler, Summit, N.J., assignor to Air Reduction Company, Incorporated, New York, N.Y., a corporation of New York
No Drawing. Filed Aug. 14, 1959, Ser. No. 833,707
6 Claims. (Cl. 260—89.1)

This invention relates to the production of the polyvinyl acetate and to derivatives thereof.

Various techniques are known for the production of polymeric vinyl acetate. Generally these prior techniques involve free radical-type polymerization at elevated temperatures with the production of polymeric vinyl acetate products having a highly branched structure. Such branched chain polymeric vinyl acetate products have significant disadvantages, for example, in the production of polyvinyl alcohol. During the conversion to polyvinyl alcohol, chain cleavage occurs with the branched chain polymers, which cleave results in product polyvinyl alcohol having a significantly lower degree of polymerization than the parent polyvinyl acetate and also having a wider molecular weight distribution.

It is an object of the present invention to provide an improved process for the production of linear polyvinyl acetate.

It is a further object of the present invention to provide for the production of polyvinyl acetate from which improved polyvinyl alcohol can be prepared.

It is an additional object of this invention to provide for the production of linear polyvinyl acetate having an ordered or crystalline structure.

Other objects of the invention will be apparent from the following description.

In accordance with the present invention, it has been found that polyvinyl acetate having a very high degree of linearity can be produced in good yield by a polymerization process involving the use of a trialkyl aluminum compound or a dialkyl aluminum hydride as catalyst initiator together with the use of low polymerization temperatures. Further, it has been found that polyvinyl acetate having an ordered or crystalline configuration can be produced using the above initiators with very low polymerization temperatures or at higher temperatures where a special solvent is employed.

In carrying out the invention, a trialkyl aluminum compound or a dialkyl aluminum hydride is employed as polymerization initiator. The aluminum compound initiators preferably contain lower alkyl groups, i.e. about $C_1-C_5$ alkyl groups. Triisobutyl aluminum is an especially preferred initiator. Other specific suitable initiators include trimethyl aluminum, tripropyl aluminum, triisopropyl aluminum, tributyl aluminum, diisobutyl aluminum hydride, dimethyl aluminum hydride, and dipropyl aluminum hydride, as well as aluminum compounds containing different alkyl groups in the same molecule. In practice of the invention, the polymerization initiator is employed in amounts ranging from about 0.1 to 10% by weght based on the monomer. A preferred range of initiator concentration is about 0.5 to 5% by weight of monomer.

In carrying out the invention, in order to obtain a linear polyvinyl acetate product, low polymerization temperatures of the order of about $-100°$ C. to $0°$ C. and preferably about $-50°$ C. to $-10°$ C. are employed. Higher temperatures tend to result in the production of less linear polymer product. At very low temperatures, significant branching may occur as a result of the long time of contact between the polymerizing materials and the initiator. Certain solvents, especially tetrahydrofuran have been found to increase the polymerization rate. These solvents are especially preferably used in polymerizations at very low temperatures, e.g. $-80°$ C., to reduce the polymerization time and branching caused by long polymerization times.

In order to prepare crystalline polyvinyl acetate, very low polymerization temperatures of the order of about $-100°$ C. to $-50°$ C. are employed where the polymerization is in bulk or in a solvent which dissolves both monomer and polymer. Where a special solvent as further described hereinafter is used, the polymerization can be carried out at significantly higher temperatures, e.g. up to about room temperature with the production of crystalline polyvinyl acetate. The special solvent is a precipitating solvent in which the monomer is soluble but in which the formed polyvinyl acetate is not soluble. Examples of suitable precipitating solvents include hexane, octane, decane, pentane, gasoline, diethyl ether, and the like. The solvent is used in amount sufficient to precipitate polymer as formed from the monomer solution.

Polymerization times can range widely, for example, from several hours to two weeks or so. Usually polymerization times of about five hours to three days are preferred. When long polymerization times are employed at very low temperatures, significant chain branching may occur as a result of the prolonged contact of the polymerization mixture with the initiator. The long polymerization times may be greatly lessened through the use of solvents such as tetrahydrofuran which increase the rate polymerization.

In accordance with this invention, it has been found possible to prepare completely linear polyvinyl acetate. The complete linearity of this polyvinyl acetate was shown by the fact that product polyvinyl acetate was converted to polyvinyl alcohol and subsequently reacetylated to the original polymeric vinyl ester without changing the intrinsic viscosity of the original polymer. Normally, where the polyvinyl acetate is branched, cleavage occurs upon the conversion to polyvinyl alcohol, and on reacetylation the intrinsic viscosity of the acetylated product is less than that of the original material.

Additionally, the invention provides a process for the production of crystalline polyvinyl acetate as established by X-ray crystallinity measurements. By proper selection of reaction conditions, polyvinyl acetate which is both linear and crystalline can be prepared by this invention. These conditions involve polymerization temperatures in the range of about $-60°$ C. to $0°$ C. At the higher temperatures a precipitating solvent is needed to ensure crystallinity.

Polyvinyl alcohol of very high molecular weight can be formed from the polymeric vinyl acetate prepared by the invention by conventional conversion techniques, i.e. alkaline alcoholysis. Such polyvinyl alcohol has outstanding properties such as high resistance to water as well as

Example I

Vinyl acetate in amount of 25 ml. was placed in a 50 ml. Erlenmeyer flask. The flask was flushed with nitrogen. The flask was stoppered under an atmosphere of nitrogen and cooled to −80° C. About 0.5 ml. of a 50% by volume solution of triisobutyl aluminum in heptane was injected into the vinyl acetate. The flask was maintained at a temperature of −15° C. for 24 hours.

After the 24 hour period the reaction mixture was dissolved in 100 ml. of acetone and the polymer was precipitated by pouring the acetone solution into 750 ml. of hexane. Polymer was recovered in amount of 4.5 grams for a polymerization conversion of about 19.5%. The polyvinyl acetate thus obtained had an intrinsic viscosity in benzene at 25° C. of 1.55 and a degree of polymerization of about 5000. The product was not crystalline.

About 3 grams of the product polyvinyl acetate were dissolved in 100 ml. of methanol. To this was added 0.5 grams of NaOH dissolved in 30 ml. of methanol. This mixture was stirred at about room temperature for a sufficient time to convert the polyvinyl acetate to polyvinyl alcohol.

1 gram of the polyvinyl alcohol thus obtained was added to a mixture of 20 ml. glacial acetic acid, 20 ml. of acetic anhydride and 2 ml. pyridine. This mixture was heated to 100° C. and stirred for 24 hours in order to convert the polyvinyl alcohol to polyvinyl acetate.

The reacetylated polyvinyl acetate was precipitated in water and dried under vacuum. The intrinsic viscosity of the reacetylated product in benzene at 25° C. was 1.55.

The fact that the intrinsic viscosity of the polyvinyl acetate upon conversion to polyvinyl alcohol and reacetylation remained the same shows that the polymeric product obtained in accordance with this invention was completely linear.

Example II

A mixture of 15 ml. vinyl acetate and 10 ml. hexane was placed in a reaction vessel. The vessel was flushed with nitrogen and sealed. About 0.5 ml. of a 50% by volume solution of triisobutyl aluminum in heptane was injected into the sealed vessel. The resulting mixture was maintained at −15° C. for three days. The polymer precipitated as it was formed.

The polymerization mixture was poured into 700 ml. of hexane containing 5 ml. of methanol to decompose the catalyst, and about 2.5 grams of polymer product amounting to a polymer conversion of about 18.1% were obtained.

X-ray measurements of the polymer thus obtained showed absorption maxima at 9.4 A., 4.84 A., and 4.57 A., and indicated that the polymer was comprised of about 5% crystalline polyvinyl acetate.

This example shows the effect of the use of a precipitating solvent on the crystallinity of the polymeric product. In this example even at a temperature as high as −15° C. a crystalline type polymer was obtained through the use of hexane as the precipitating solvent.

Example III 25 ml. of vinyl acetate were polymerized at −80° C. under a nitrogen atmosphere using 0.5 ml. of a 50% by volume solution in heptane of triisobutyl aluminum initiator for seven days. Polyvinyl acetate in amount of 6.7 grams amounting to a polymerization conversion of about 29.4% was obtained.

The polyvinyl acetate was converted to polyvinyl alcohol in a manner similar to that described in Example I. About 0.5 gram of the polyvinyl alcohol thus obtained was placed in 50 ml. of water and stirred overnight at 25° C. Only a slight swelling of the polyvinyl alcohol occurred. The temperature was raised to 75 to 80° C. and a major portion of the polyvinyl alcohol slowly dissolved. The temperature was lowered to 25° C. and stirring continued overnight. The polyvinyl alcohol separated from solution in the form of a gel. The gelled polyvinyl alcohol was heated to 75 to 80° C. for one day but did not dissolve. The gel was further heated to 90 to 95° C. for a full day before dissolving.

Example IV

About 396 ml. of vinyl acetate was admixed with 5 ml. of 50% by volume heptane solution of triisobutyl aluminum under a nitrogen atmosphere. The mixture was maintained at −80° C. for twelve days. After six days an additional 5 ml. of the initiator solution was added. The polymer formed after twelve days was precipitated in three liters of hexane. About 106 grams of polymer were obtained amounting to about a 28.8% polymer conversion. The intrinsic viscosity of the polymer in benzene at 25° C. was 1.3. X-ray measurements showed that the polymer obtained was comprised of a significant amount of crystalline polyvinyl acetate.

Example V

A mixture of 15 ml. of vinyl acetate and 15 ml. of tetrahydrofuran was placed in a flask. The flask was flushed with nitrogen, sealed under a nitrogen atmosphere and cooled to −80° C. About 0.5 ml. of a 50% by volume heptane solution of triisobutyl aluminum was injected into the mixture. The resulting mixture was maintained at −15° C. for three days.

The polymer obtained after three days was precipitated by pouring the polymerization mixture into 700 ml. of hexane containing 5 ml. of methanol. About 6 grams of polymer were obtained for a polymerization conversion of about 43.5%. The polymer was not crystalline and had an intrinsic viscosity in benzene at 25° C. of 0.13.

This example demonstrates the improved polymerization rate obtained through the use of tetrahydrofuran solvent.

I claim:

1. The process for preparing linear polyvinyl acetate which comprises homopolymerizing vinyl acetate at a temperature of 0°C. to −100° C. in the absence of air and in contact with about 0.1 to 10% by weight of vinyl acetate of a polymerization initiator consisting solely of a compound selected from the group consisting of a trialkyl aluminum compound and a dialkyl aluminum hydride said alkyl groups containing from 1 to 5 carbon atoms.

2. The process according to claim 1 wherein the polymerization is conducted in contact with tetrahydrofuran.

3. The process according to claim 1 wherein the polymerization initiator is triisobutyl aluminum.

4. The process for preparing crystalline polyvinyl acetate which comprises homopolymerizing vinyl acetate at a temperature of −100° C. to −50° C. in the absence of air and in contact with about 0.1 to 10% by weight of vinyl acetate of a polymerization initiator consisting solely of a compound selected from the group consisting of a trialkyl aluminum compound and a dialkyl aluminum hydride said alkyl groups containing from 1 to 5 carbon atoms.

5. The process of preparing crystalline polyvinyl acetate which comprises homopolymerizing vinyl acetate at a temperature of −100° C. to room temperature in the absence of air and in a precipitating solvent in contact with 0.1% to 10% by weight of the vinyl acetate of a polymerization initiator consisting solely of a compound selected from the group consisting of a trialkyl aluminum compound and a dialkyl aluminum hydride said alkyl groups containing from 1 to 5 carbon atoms.

6. The process of preparing crystalline polyvinyl acetate which comprises homopolymerizing vinyl acetate at a temperature of −100° C. to room temperature in the absence of air and in hexane solvent in contact with a polymerization initiator consisting solely of triisobutyl aluminum.

References Cited in the file of this patent

UNITED STATES PATENTS

| | | |
|---|---|---|
| 2,559,630 | Bullitt | July 10, 1951 |
| 2,608,555 | Bullitt | Aug. 26, 1952 |
| 2,841,574 | Foster | July 1, 1958 |
| 2,842,474 | Pratt | July 8, 1958 |

FOREIGN PATENTS

| | | |
|---|---|---|
| 767,417 | Great Britain | Feb. 6, 1957 |
| 819,291 | Great Britain | Sept. 2, 1959 |

OTHER REFERENCES

Haas et al.: Journal of Polymer Chemistry, vol. 22, pages 291–302.

Ashikari: Journal of Polymer Science, 28, 250 (1958), pp. 250–252.

Linear and Stereoregular Addition of Polymers, Gaylord, Interscience publisher, N.Y. (1959).

Schildknecht et al.: Industrial and Engineering Chemistry, vol. 41, pages 1998–2003, September 1959.